(12) United States Patent
Zhong et al.

(10) Patent No.: US 7,912,987 B2
(45) Date of Patent: Mar. 22, 2011

(54) USB DEVICES IN APPLICATION SERVER ENVIRONMENTS

(75) Inventors: Chenyin Zhong, Bellevue, WA (US); Makarand V. Patwardhan, Redmond, WA (US); John C. Dunn, Issaquah, WA (US); Joy Chik, Sammamish, WA (US); Vinod M. Mamtani, Redmond, WA (US)

(73) Assignee: Microsoft Corporation, Remond, WA (US)

( * ) Notice: Subject to any disclaimer, the term of this patent is extended or adjusted under 35 U.S.C. 154(b) by 1042 days.

(21) Appl. No.: 11/036,893

(22) Filed: Jan. 14, 2005

(65) Prior Publication Data

US 2006/0161617 A1 Jul. 20, 2006

(51) Int. Cl.
*G06F 15/16* (2006.01)
(52) U.S. Cl. ........ 709/250; 709/203; 709/229; 709/245; 717/127; 719/321
(58) Field of Classification Search ................. 709/203, 709/220, 229, 245, 250; 719/321
See application file for complete search history.

(56) References Cited

U.S. PATENT DOCUMENTS

| 6,973,512 | B1 * | 12/2005 | Koeman ........................ 710/38 |
| 7,082,598 | B1 * | 7/2006 | Le et al. ........................ 717/127 |
| 7,103,788 | B1 * | 9/2006 | Souza et al. ................... 713/323 |
| 7,287,257 | B2 * | 10/2007 | Meza ............................. 719/321 |
| 2002/0128065 | A1 * | 9/2002 | Chung et al. .................... 463/42 |
| 2003/0142661 | A1 | 7/2003 | Chatani |
| 2006/0123129 | A1 * | 6/2006 | Toebes et al. ................. 709/230 |

FOREIGN PATENT DOCUMENTS

| JP | 2003325986 | 11/2003 |
| WO | WO0235789 | 5/2002 |

OTHER PUBLICATIONS

Jia et al, "Design and Implementation of an Open Autonomous Mobile Robot System", Robotics and Automation, 2004. Proceedings. ICRA '04. 2004 IEEE International Conference on New Orleans, LA. Apr. 26-May 1, 2004, pp. 1726-1731.

* cited by examiner

*Primary Examiner* — Yves Dalencourt
(74) *Attorney, Agent, or Firm* — Lee & Hayes, PLLC

(57) ABSTRACT

One or more universal serial bus (USB) devices are connected at a client computer. The USB devices are recognized by the client computer and a determination is made as to whether an application server computer provides functionality for one or more of the USB devices. A specific communication path is provided from the USB device to the server computer if functionality is provided by the application server computer.

20 Claims, 8 Drawing Sheets

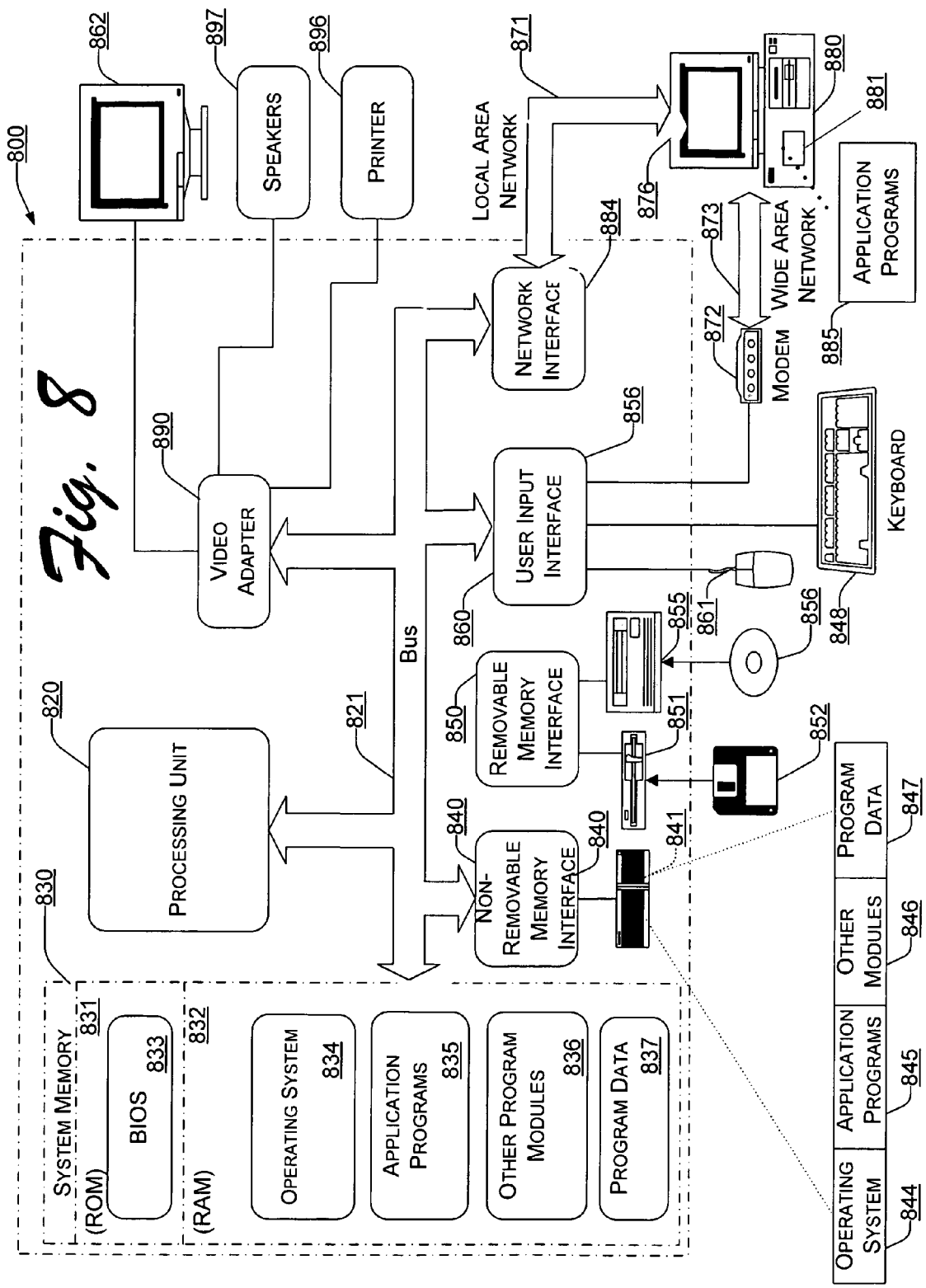

USB DEVICES IN APPLICATION SERVER ENVIRONMENTS

TECHNICAL FIELD

This disclosure relates to directing access and control of universal serial bus (USB) devices to computers such as server computers.

BACKGROUND

Remote client access platforms and systems, such the Terminal Service™ provided by the Microsoft Corporation, allow computers to remotely access application programs that are hosted by and resident at an application server. In remote client access systems, client computers typically rely on a server computer to provide computing functionality through application programs resident at the server computer. Examples of application programs include word processing, multimedia, and data management programs.

The application server computer may be referred to as a host computer or terminal server. The client computer may be referred to as a remote terminal, remote client, or a thin client. The client computer primarily is used for user interface: interaction with a user and device I/O. Software on the client computer is typically generic or not application specific, generally consisting of an operating system and general purpose software—including software to support the remote client access environment. Software at the server computer typically includes specific-purpose application software that provides particular functionality, such as database access, word processing, drafting, and many other types of applications. Data communicated between the client computer and the application server mostly includes commands and data relating to user interface, such as graphics data, keystrokes, mouse movements, etc., as well as commands and data relating to hardware devices located at the client computer.

The application server and clients typically communicate or pass information with one another using a predefined communication protocol such as the remote desktop protocol (RDP) as defined by the Microsoft Corporation. Lower level network protocols such as TCP/IP are also involved.

Benefits of remote client access systems are that the client computers can be relatively low-powered since most functionality and computation takes place at the server computer. Although the application server is often more expensive than a typical desktop computer, one application server computer can service many less expensive clients.

Another advantage in some systems is that data can reside at the physical location of the server computer, and can be acted upon at that location by application programs without having to be transferred over relatively slow communications links to the client computers—only the user interface is implemented at the physical locations of the client computers.

Client computers often have USB (universal serial bus) ports to which peripheral devices are attached. Such devices often relate to the user interface, as in the case of USB keyboards. In many cases, applications executing at the server computer need to access and interact with such USB devices. Other examples of USB devices include digital cameras, document scanners, external disk drives, and media readers. Various applications hosted by the application server may need to interact with these hardware devices.

In a typical Windows®-based desktop environment, local applications communicate with USB devices through a series of drivers, referred to as a driver stack. Different responsibilities are divided among components of the stack for purposes of organization and re-usability. For example, some of the drivers are generic to all or certain general classes of USB devices and can be used or re-used to communicate with many different devices. Other drivers implement functionality that is specific to certain devices, and are often designed specifically to accompany certain hardware.

FIG. 1 illustrates a typical USB architecture implemented within a computer acting as a standalone computer-not as a client of an application server. FIG. 1 shows logical communications between hardware and software components.

The system of FIG. 1 includes a computer 100 and a USB device 105. USB device 105 is connected to computer 100 through a physical USB port (not shown). An application program 110 executes on the computer and interacts with USB device 105 through a driver stack 115. The driver stack 115 in this example has three USB drivers.

At the lowest level of the driver stack 115, a USB host controller driver 120 communicates directly to the USB hardware (not shown) in the computer, and through that hardware to the USB device 105. Above that, a low-level USB bus driver 125 (also referred to as a hub or hub driver) communicates with USB host controller 120, and manages USB device power, enumeration, and various USB transactions. Both of these drivers are part of the Windows® operating system and are generic to all USB devices; these drivers do not have to be replaced or modified as a function of the type of USB devices that are connected to the computer 100.

Driver stack 115 also includes a USB function driver 130. The USB function driver 130 is customized for a particular device or class of devices. As a result, a different function driver is loaded depending on the actual USB device being used. USB function drivers are also referred to as USB device function drivers, class drivers, or custom drivers.

Although FIG. 1 shows only a single application program 110, computer 100 typically has a plurality of application programs, any one or more of which may be configured to interact with USB device 105 through the single driver stack 115 shown. Application program 110 may be a word processing program, a game program, or any of various other types of programs.

FIG. 2 shows a similar example in which a computer 200 has a plurality of application programs 205 and 210 and a plurality of USB devices 215, 220, and 225. In this example, application program 205 interacts with USB device 215, while application program 210 interacts with USB devices 220 and 225.

As in the previous example, communications are implemented by a USB driver stack 230. The USB driver stack 230 includes a USB host controller 235 and a USB bus driver 240 that communicate with each of USB devices 215, 220, and 225. The USB driver stack 230 further includes a plurality of USB function drivers 245, 250, and 255 corresponding to each of USB devices 215, 220, and 225. As already described, each of these USB function drivers 245, 250, and 255 is selected and loaded based upon the particular type or class of USB device.

As shown, an application program can interact with more than a single USB device. If multiple USB devices are installed, they commonly use the same host controller driver and bus driver, although it is possible for a single computer to have more than one USB driver stack. If different kinds of USB ports are used, different port and "mini-port" drivers may be loaded; however, in general the overall USB driver stack remains the same.

FIG. 3 illustrates use of USB devices in a prior art remote client/server architecture. In this example, a client computer 300 has one or more USB devices 305(1)-305(N) connected to its USB ports. It also has operating system or other low-level support for such USB devices. In particular, remote client computer 300 includes a USB host controller 310 that connects with USB devices 305.

Client computer 300 performs user interaction in response to commands and data transferred between itself and a server computer 315. One or more application programs 320 reside at server computer 315 and execute thereon. In order to support remotely located USB devices 305, the operating system or other support software of server computer 315 includes USB support. In particular, server computer 315 includes USB function device drivers 325(1)-325(N), a USB bus driver 330, and a USB host controller 335.

USB function device drivers 325 perform similar functions as USB function device driver 130 described above. USB function device drivers 325 communicate with a USB bus driver 330. Likewise, USB bus driver 330 performs similar functions as USB bus driver 125 described above. Server computer 315 further includes a USB host controller 335 connected to or communicating with USB host controller 310 of client computer 300. Communication between USB host controller 310 and USB host controller 335 may be through a direct physical connection or include an intermediate network connecting the two. USB host controller 335 through communication with USB host controller 310 communicates with and accesses USB devices 305. In this example, client computer 300 relies completely on server computer 315 to provide all the needed functionality through application programs 320 for USB devices 305.

In contrast to the operation of the standalone computer shown in FIG. 1, in the client server arrangement of FIG. 2, all functionality in the form of application programs 320 is provided at the server computer 315. In other words the client computer 300 relies on server computer 315 for all functionality for USB devices 305. In this arrangement, client computer 300 does not provide or is allowed to provide any functionality to any of the USB devices 305.

SUMMARY

One or more universal serial bus (USB) devices are connected at a client computer. Access and control to a particular USB device are provided to a server computer and a specific communication path is provided at the client computer from the particular USB device to the server computer. Commands from the server computer are received and data sent from the particular USB device to the server computer.

The server computer recognizes the particular USB device connected to the client computer and a specific communication path is provided at the server computer for the particular USB device, the server computer sends commands to the USB device, and receives data from the USB device through the communication path at the server computer.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

FIG. 8 is a block diagram of an implementation of a client computer or an application server computer.

DETAILED DESCRIPTION

The following disclosure describes directing or redirecting access and control of particular USB devices to an application server computer. The USB devices are connected at a client computer which communicates with the application server computer.

Client-Server Computer System

Figure 4:
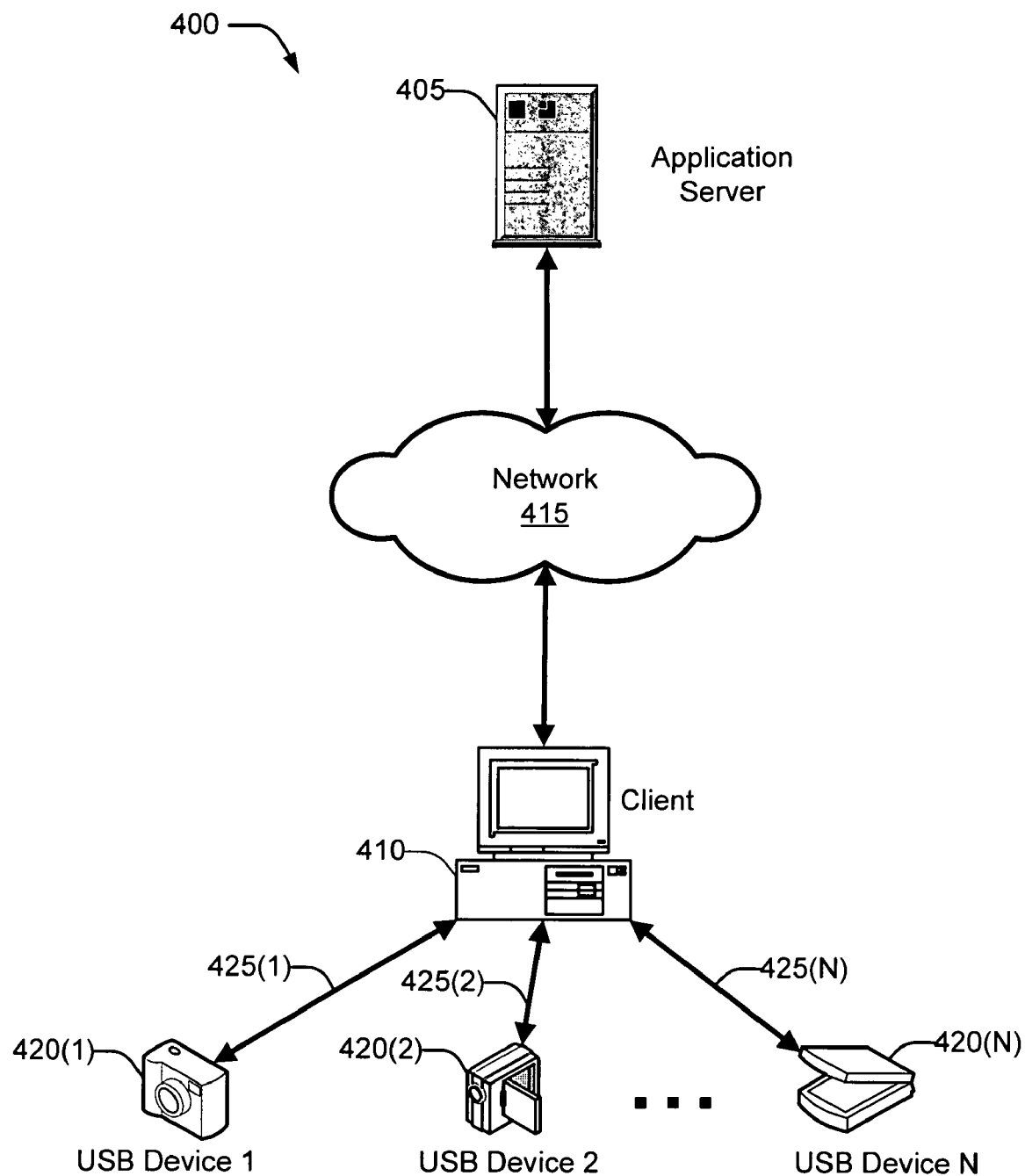
FIG. 4 is an illustration of remote client access system where one or more USB devices are either controlled by a client computer or an application server computer.

FIG. 4 shows a remote client access system 400. The system 400 includes an application server computer 405 and one or more client computers. Access and control of universal serial bus (USB) devices connected at the client computers may be directed or redirected to the application server computer 405. In particular, the USB devices at the client computers are selectively accessed and controlled by the application server computer 405. The system 400 may be a Terminal Service™ system as provided or defined by the Microsoft Corporation, where the multiple client computers rely on application server computer 405 for all or certain application programs that provide functionality, and particularly access and control of one or more USB devices. In this example, a client computer 410 is illustrated and is exemplary of other client computers.

A network 415 connects application server computer 405 and client computer 410. The network 415 may be implemented in a number of ways to support such networking contexts, including both wired-based technologies and wireless technologies. Aspects of this invention are not limited to one specific network architecture or network technology. The system 400 is representative of different architectures which include direct dialup via modem, enterprise LANs (local area networks), WANs (wide area networks) and the Internet. Network 415 connects the server computer 405 to the one or more client computers (e.g., client computer 410). Furthermore, the network 415 connection between the server computer 405 and client computers may implement a transport protocol such as transmission control protocol over Internet protocol (TCP/IP).

The server computer 405 is implemented with an operating system such as Windows® Server 2003 operating system provided by the Microsoft Corporation. Server computer 405 and client computer 410 may implement a communication protocol such as remote data protocol (RDP) defined by the Microsoft Corporation, in order to pass data or information (i.e., communicate) with one another. The use of such communication protocols, and particularly RDP, may be implemented in the context of a remote client access system such as a Terminal Services™ system.

Client computer 410 may be a general-purpose PC (personal computer), a laptop PC, tablet PC, or the like, and implement an operating system such as a Windows® brand operating system from the Microsoft Corporation. Client computer 410 is a standalone computer that primarily interfaces to application server computer 305 to access files or other information (e.g., application programs resident at application server computer 405) that are not locally stored at client computer 410.

Client computer 410 is equipped with one or more USB ports that support existing legacy, and future USB standards such as USB 1.0, 1.1, and 2.0. The USB standards allow for ports (computer interfaces) to be split and USB devices to be "daisy chained". In other words, a port on client computer 410 may be "split" into multiple ports, thus allowing multiple devices to use the same port. USB ports may be connected to particular USB hubs in the client computer 410 (i.e., USB 1.1 devices are connected to USB 1.1 hub; USB 2.0 devices are connected to a USB 2.0 hub).

The USB hubs are connected to a host controller such as a USB 1.1 host controller or a USB 2.0 host controller. In certain cases, the host controller may support multiple USB standards (e.g., a USB host controller that supports USB 1.1 and 2.0). The host controller is connected to a bus such as a PCI (peripheral component interconnect) bus of the client computer 410. The PCI bus is accessed by a central processing unit (CPU) or processor of the client computer 410. The hardware architecture of client computer 410 is further discussed below in reference to FIG. 8.

Client computer 410 is connected to one or more USB devices 420(1), 420(2) and 420(N). USB devices 420 include and are not limited to digital cameras, video cameras, hard disk storage devices, digital media recorders, printers, and scanners. USB devices such as USB devices 420 are defined by particular device classes. In other words, there are specific device classes for digital cameras, video cameras, hard disk storage devices, digital media recorders, printers, scanners, etc. Client computer 410 and USB devices 420 are particularly connected by respective USB connections 425(1), 425(2) and 425(N). USB connections 425 are connected to one or more of the USB ports at client computer 410 as discussed above.

Client and Server Computer Architectures

Figure 5:
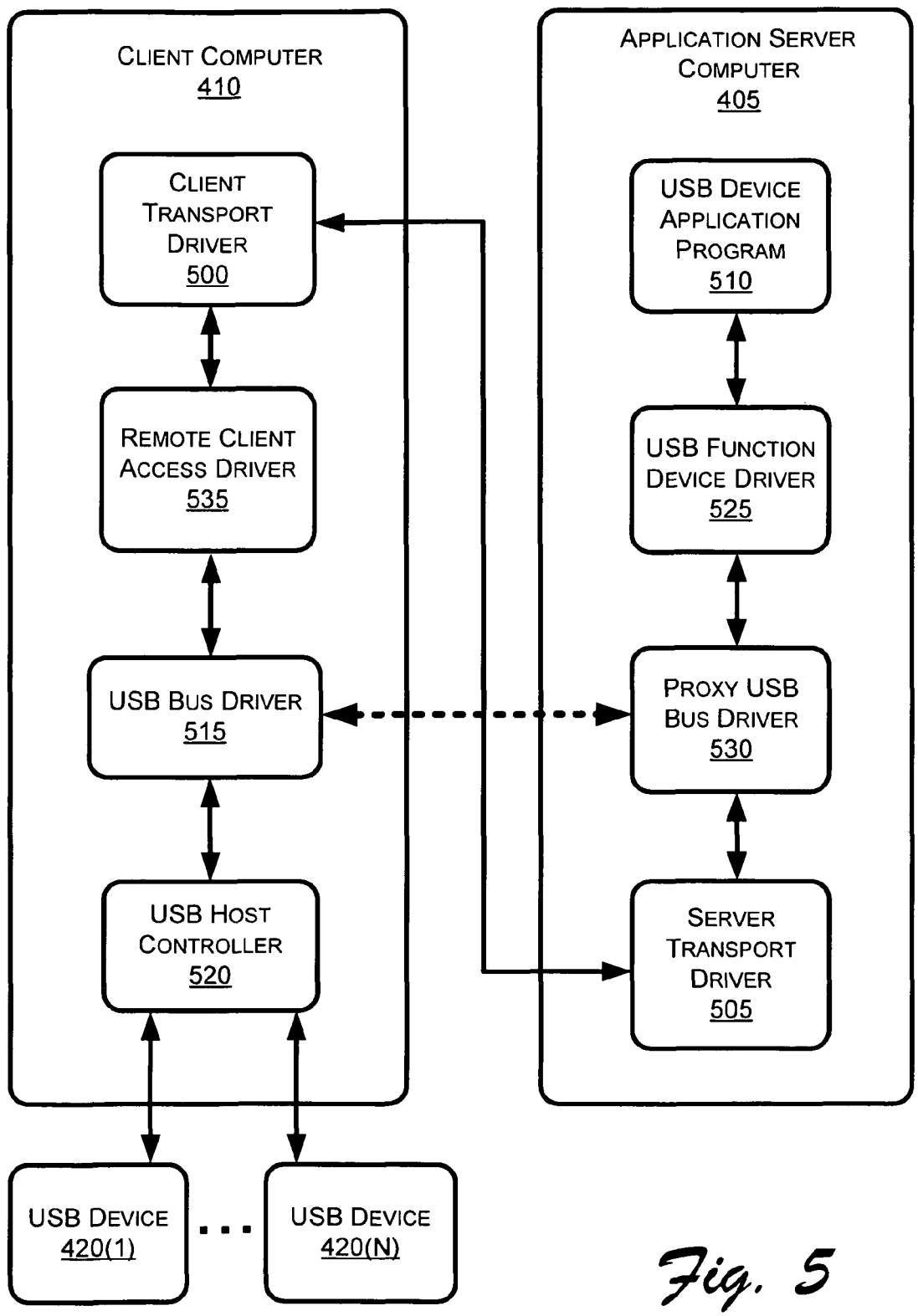
FIG. 5 is a block diagram of a client computer and an application server computer where functionality for a USB device is provided at the application server computer.

FIG. 5 shows example top level architectures at application server computer 405 and client computer 410 where functionality for USB devices 420 is provided at application server computer 405.

Figure 1:
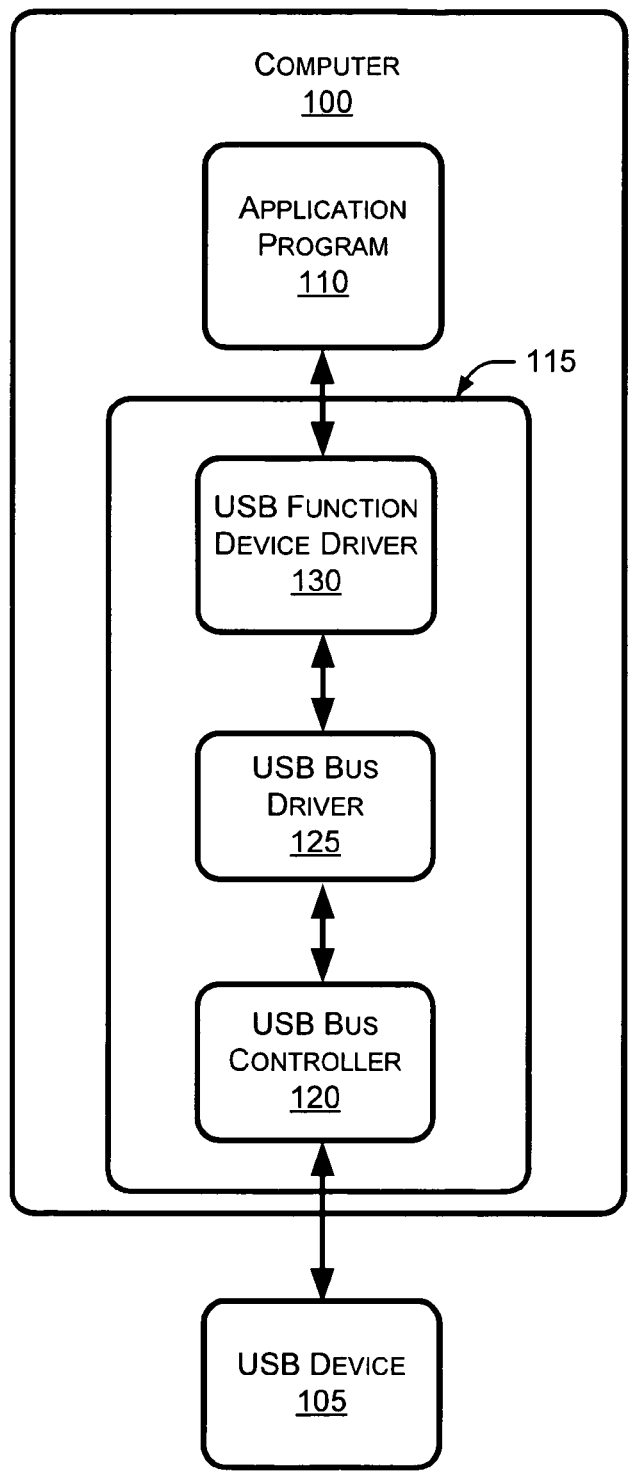
FIG. 1 is a block diagram of a prior art USB architecture implemented at a computer.
Figure 2:
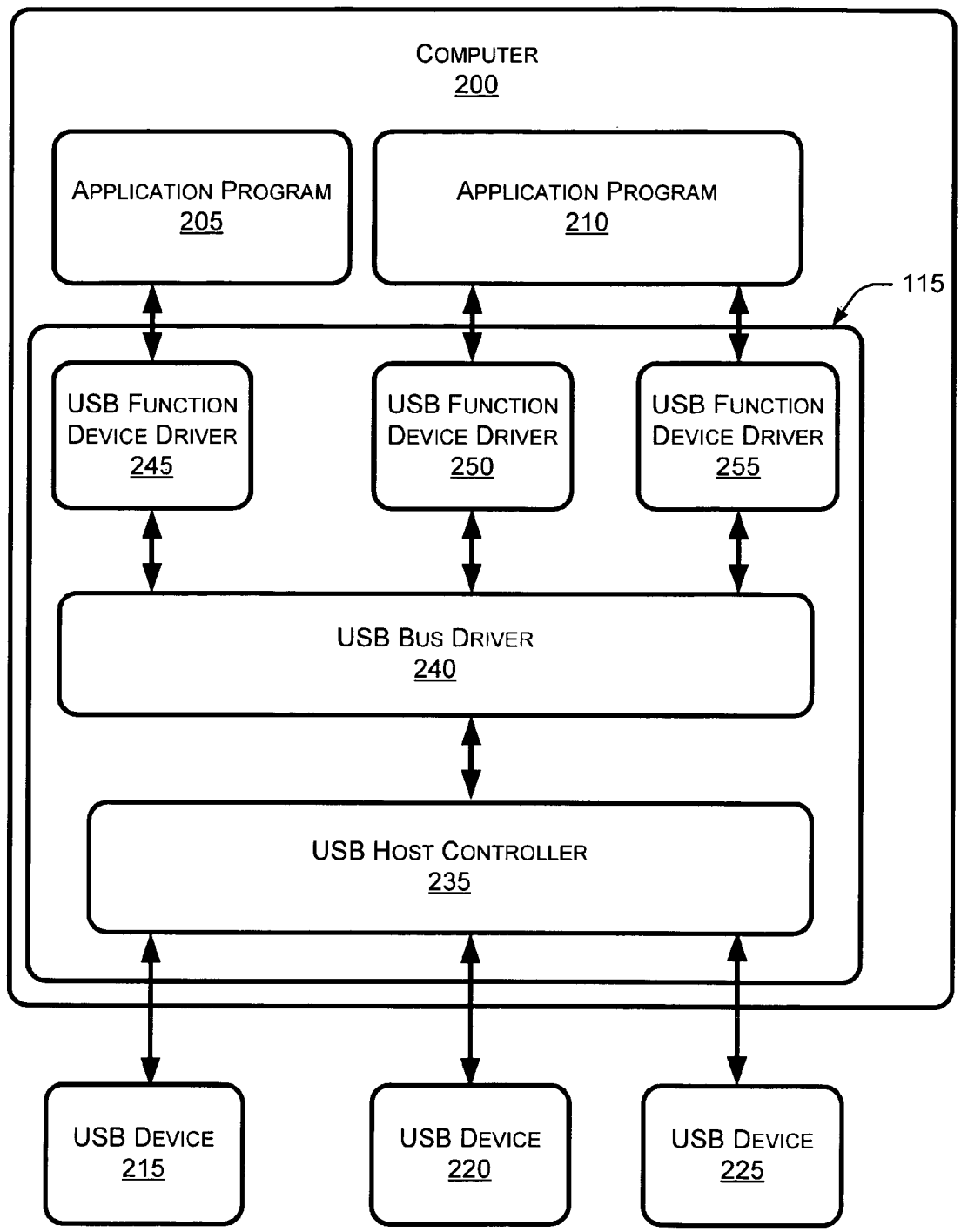
FIG. 2 is a block diagram of a prior art USB architecture implemented at a computer with a plurality of application programs and a plurality of USB devices.
Figure 3:
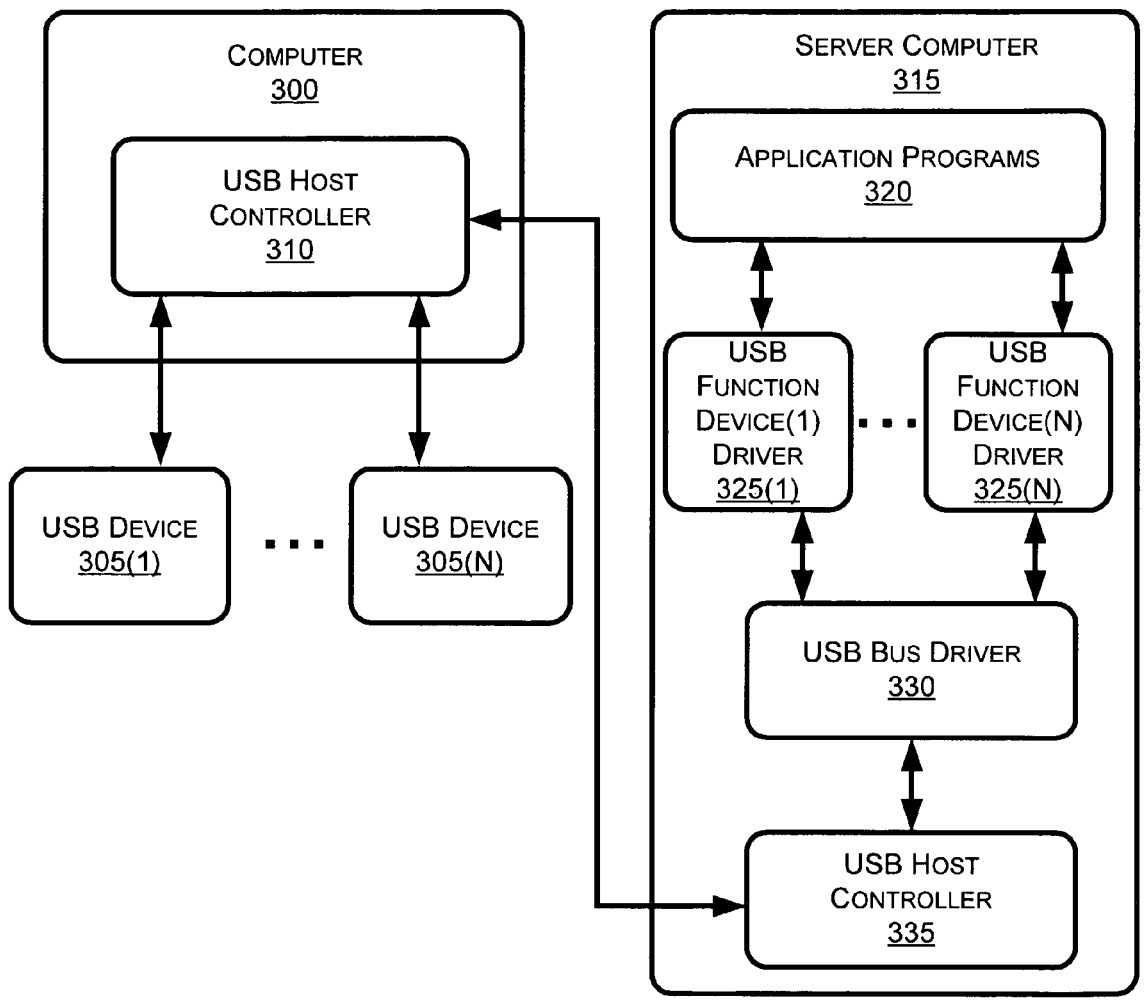
FIG. 3 is a block diagram of a prior art architecture of remote access of one or more USB devices.

Client computer 410 and application server computer 405 communicate with one another through their respective client transport driver 500 and server transport driver 505. As discussed above in FIG. 1, a network such as network 415 may connect server computer 405 and client computer 410. Furthermore, the client computer 410, server computer 405, and network (e.g., network 415) may be part of a larger remote client access system such as system 400.

In this example, client computer 410 relies on application server computer 405 to provide functionality for USB devices 420. An application program 510 resident at application server computer 405 specifically provides the functionality for one or more of USB devices 420. Such functionality for one or more of USB devices 420 may be provided by application server computer 405 in support of various remote client access system scenarios.

An exemplary scenario is when the client computer 410 has no functionality (i.e., no application programs) to support USB devices. This scenario is typical when client computer 410 is a thin client and relies on all functionality to be provided by server computer 405.

Another scenario is when client computer 410 has limited functionality or a select number of application programs to support USB devices. However, the limited number of application programs resident on client computer 410 does not include an application program that particularly supports one or more USB devices 420. Server computer 405 includes the particular application program 510 that provides the functionality needed by one or more USB devices 420. Control of one or more USB devices 420 may be determined through a plug and play (PNP) feature of the architecture of client computer 410. In specific, USB bus driver 515 recognizes one or more USB devices 420 and communicates the presence of the one or more USB devices 420 to other components (e.g., a CPU of client computer), drivers, or software modules. A USB host controller 520 interfaces with the USB bus driver, and provides a physical or logical connection to USB devices 420. If it is determined by the other components, drivers, or software modules that an acceptable application program to support the one or more USB devices 420 is not resident on client computer 410, control to the one or more USB devices 420 is directed to application server computer 405.

In other exemplary scenarios, client computer 410 may include a resident application program that supports one or more USB devices 420; however, for one of a number of reasons a user at client computer 410 may decide to direct support and functionality of the one or more USB devices 420 to application server computer 405. This user initiated operation provides application server computer 405 access and control to the one or more USB devices 420.

Application program 510 communicates with a USB function device driver 525. USB function device driver 525 is specific to a device class of particular USB devices. USB function device driver 525 creates a particular functional device object (FDO) representative of class of USB devices. The particular FDO is a data object representative of a class of USB devices, and exposes or provides an interface to application program 510. As a data object resident on USB function device driver 525, the FDO or the interface that is exposed by the FDO is particularly recognized by application program 510.

USB function device driver 525 communicates with a proxy USB bus driver 530. Proxy USB bus driver 530 is device-independent and supports multiple USB devices which include local USB devices, and remote USB devices such as USB devices 420. USB function device driver 525 creates a physical device object (PDO) that is a data object representative of and specific to one of USB device 420. The PDO data object is representative of one of the USB devices 420 and is specific to that particular USB device. Unique or specific PDOs allow server computer 405 through the use of proxy USB bus driver 530 to distinguish between particular USB devices. Furthermore, through the respective intermediary interfaces 500 and 505, proxy USB bus driver 530 communicates with a remote client access driver 535. Remote client access driver 535 performs the particular function of passing commands originating from server computer 405 (i.e., commands from application program 410). Proxy USB bus driver 530 logically communicates with USB bus driver 515.

Communications to and from application program 510 may comprise of I/O request packets (IRP), and particularly a specific group of IRPs called I/O control (IOCTL) code. An IRP is communication data originating from application program 510 that include requests to one or more of USB devices 420 to perform an action such as a request to transfer (send) data to application program 510. IOCTL code may be used by application program 510 to communicate with USB function device driver 525. IOCTL codes are specific commands or instructions communicated by application program 510 to one or more of USB devices 420 to perform particular actions. USB function device driver 525 receives IOCTL code from application program 510 and converts the IOCTL code to IRPs that are passed to one or more of USB devices 420. Likewise, IRPs that are sent from one or more of USB device 420 are converted to IOCTLs that can be read or used by application program 510. IOCTLs are particularly used to communicate commands and/or actions (i.e., requests) from application program 510 with device or class specific drivers such as USB function device driver 525. USB function device driver 525 validates the IOCTLs, and specifically IOCTL parameters, that define a command or an action.

Figure 6:
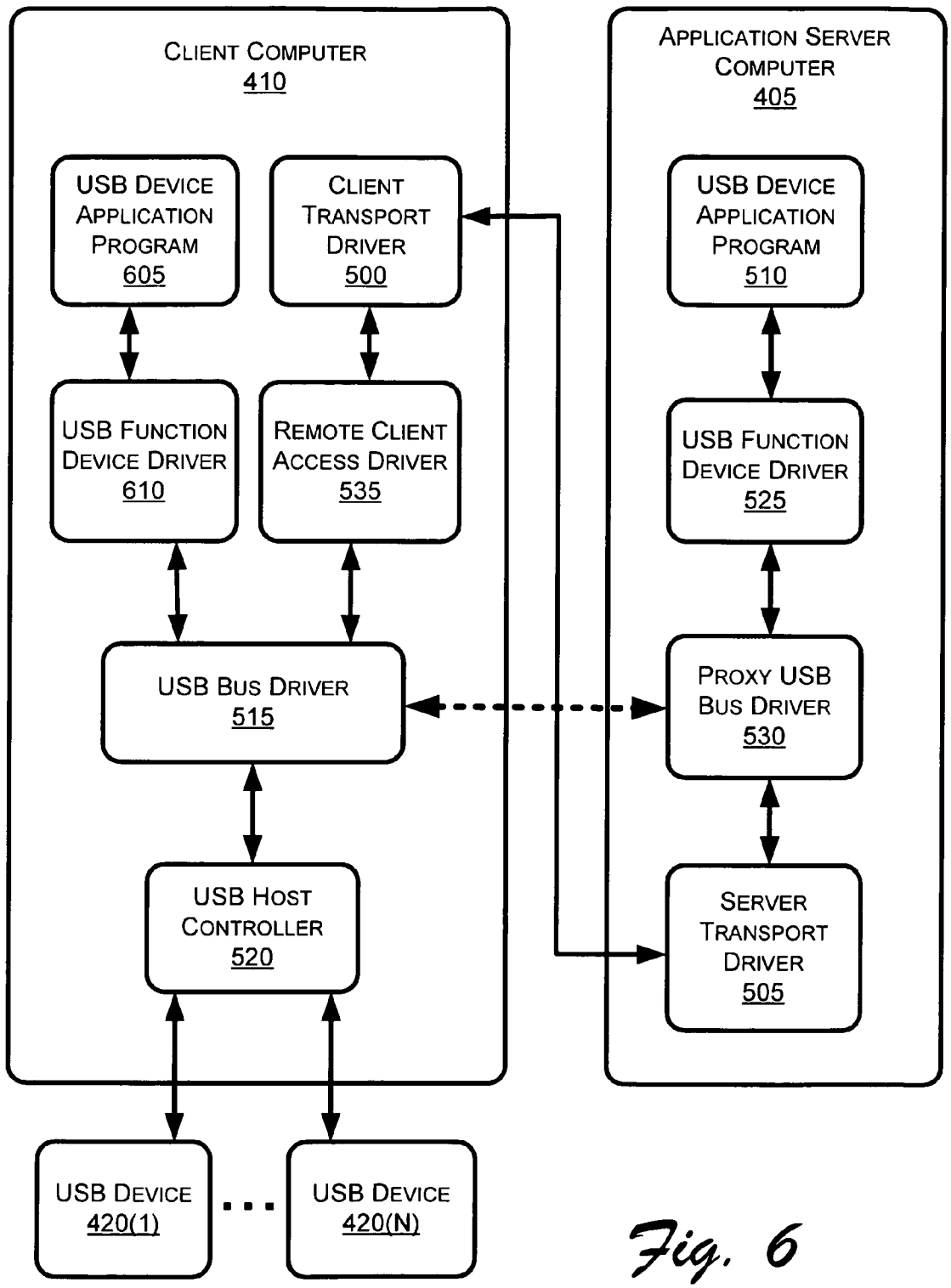
FIG. 6 is a block diagram of a client computer and an application server computer that accesses and controls USB devices.

FIG. 6 shows example top level architectures at an application server computer 405 and client computer 410 where functionality is provided by either application server computer 405 or client computer 410. One or more of USB devices 420 may be accessed and controlled by either client computer 410 or application server computer 405. In specific, an application program at either application server computer 405 or client computer 410 provides functionality to particular USB devices 420.

In a remote client access system implementation, client computer 410 is used to primarily provide input and output (I/O) such as data entered by a user through input devices such as a keyboard or mouse. In this example, I/O data is provided by USB devices 420. An application program 605 resident at client computer 410 may be used to provide functionality for one or more of USB devices 420 and particularly allows I/O data to be received and sent to one or more of USB devices 420. In specific, data or information provided by one or more of USB devices 420 is accessed by client computer 410 using application program 605. Application program 605 may also provide data or information (i.e. control) to particular USB devices 420. In certain cases, it may be desirable to direct or redirect access and control of one or more of USB devices 420 to an application program resident at server computer 405, regardless of whether an application program such as application program 605 is resident in client computer 410. Examples of application program 605 include word processing programs, multimedia programs, and data management programs.

Application program 605 communicates with a USB function device driver 610. USB function device driver 610 is specific to a device class in which one of USB devices 420 is grouped. As discussed above, particular USB function device drivers support particular USB devices. For example, USB function device drivers are specific to digital cameras, printers, disk storage units, scanners, etc. USB function device driver 610 creates a FDO representative of one or more of USB device 420—USB devices that are grouped in the same class are represented by the same FDO. The particular FDO is a data object representative of a class of devices in which one or more USB device 420 is grouped, and exposes or provides an interface to application program 605. If USB device 420 is a digital camera, the FDO (data object) that is created is representative of a general digital camera and not a particular digital camera. As a data object resident on USB function device driver 610, the FDO and the interface exposed by the FDO is recognized by application program 605, USB bus driver 515, and other drivers, modules, or components that communicate with USB function device driver 610.

USB function device driver 610 communicates with USB bus driver 515 which is also known as a "hub driver". USB bus driver 515 is device-independent and supports multiple USB devices such as USB device 420. USB bus driver 515 creates a PDO that is a data object representative of particular USB devices of USB devices 420. The PDO data object representation is specific to a particular USB device of USB devices 420. For example, if USB device 420 is one of several digital cameras that are connected, a specific PDO is created by USB hub driver 515 that identifies a particular USB device. The PDO is particularly communicated to USB host controller 520. Furthermore, the PDOs created by USB bus driver 515 may be used to identify specific USB devices to other drivers, modules, or components that communicate with USB hub driver 515.

The USB host controller 520 may be a physical interface to one or more USB devices 420, and communicates with USB bus driver 515. USB host controller 520 may be connected to a USB ports which connect to USB devices 420. Whenever one or more USB devices 420, is connected to USB host controller 520, USB host controller 520 passes on an identifier or identifying data resident in the connected one or more USB device 420 to USB bus driver 515. USB bus driver 515 creates the PDO identifying USB device 420, and the PDO is presented to other drivers, modules, or components. By identifying particular USB devices of USB device 420, client computer 410 installs (i.e., CPU or processor of client computer 410 installs) the necessary software to access and use the particular USB devices. This supports a PNP feature that does away with the need of a user to install appropriate software to support the particular USB device.

Communications to and from application program 605 may comprise of IRP, and IOCTL code. An IRP is communication data originating from application program 605 that include requests to one or more of USB devices 420 to perform an action such as a request to transfer (send) data to application program 605. IOCTL code may be used by application program 605 to communicate with USB function device driver 610. IOCTL codes are specific commands or instructions communicated by application program 605 to one or more USB devices 420 to perform particular actions. USB function device driver 610 receives IOCTL code from application program 605 and converts the IOCTL code to IRPs that are passed to the one or more USB device 420. Likewise, IRPs that are sent from the one or more USB devices 420 are converted to IOCTLs that can be read or used by application program 605. IOCTLs are particularly used to communicate commands and/or actions (i.e., requests) from application program 605 with device or class specific drivers such as USB function device driver 610. USB function device driver 610 validates the IOCTLs, and specifically IOCTL parameters, that define a command or an action.

Client transport driver 500 is provided at client computer 410 allowing remote client access communications with application server computer 405. Communications may implement a communications protocol such as the RDP communication protocol, and specifically implement the communication protocol to encode data that is sent and decode commands received by the client transport driver 500. Furthermore, client transport driver 500 may implement a transportation protocol such as TCP/IP in communicating data across a network such as the Internet.

In certain cases, functionality supporting the one or more USB devices 420 is provided by server computer 405. Remote client access driver 535 is loaded when such functionality is provided by application server computer 405. Remote client access driver 535 performs the functions provided by USB function device driver 610 which include passing commands originating from application server computer 405. Through remote client access driver 535, communication to USB device 320 is redirected from application program 605 and USB function device driver 610. Commands may be in the form of IRPs, and passed to USB bus driver 515. Furthermore, remote client access driver 535 recognizes particular PDOs created by USB bus driver 515. Remote client access driver 535 specifically recognizes the particular PDO that represents the one or more USB devices 420 and the interface that is exposed by the particular PDO.

Application server computer 405 provides specific-purpose application software that provides particular functionality to one or more client computers such as client computer 410. In this example, application server computer 405 includes application program 510 that supports or provides functionality for one or more USB devices 420. Examples of application program 510 include word processing programs, multimedia programs, and data management programs.

Application program 510 communicates with USB function device driver 525. USB function device driver 525 is specific to the device class in which particular USB devices 420 are grouped. USB function device driver 525 creates a particular FDO representative of a particular class of USB devices. As discussed above, the particular FDO is a data object representative of a class of devices, and exposes or provides an interface to application program 510. As a data object that is provided by USB function device driver 525, the FDO or the interface that is exposed by the FDO is particularly recognized by application program 510.

USB function device driver 525 communicates with proxy USB bus driver 530. Proxy USB bus driver 530 is device-independent and supports multiple local and remote USB devices such as USB devices 420. Proxy USB bus driver 530 creates a PDO that is a data object representative of and specific to a particular USB device 420. Unique or specific PDOs allow server computer 405 through the use of proxy USB bus driver 530 to distinguish between particular USB devices.

Communications to and from application program 510 may comprise of IRPs and IOCTL code. IOCTL code may specifically be used by application program 510 to communicate with USB function device driver 525. IOCTL codes are specific commands or instructions communicated by application program 510. USB function device driver 525 receives IOCTL code from application program 510 and converts the IOCTL code to IRPs that are passed to proxy USB bus driver 530. IRPs that are received by proxy USB bus driver 530 are received by a server transport driver 405. Server transport driver 405 may also pass on IRPs to proxy USB bus driver 530, where such IRPs are representative of data and requests from remote USB devices such as USB devices 420.

Figure 7:
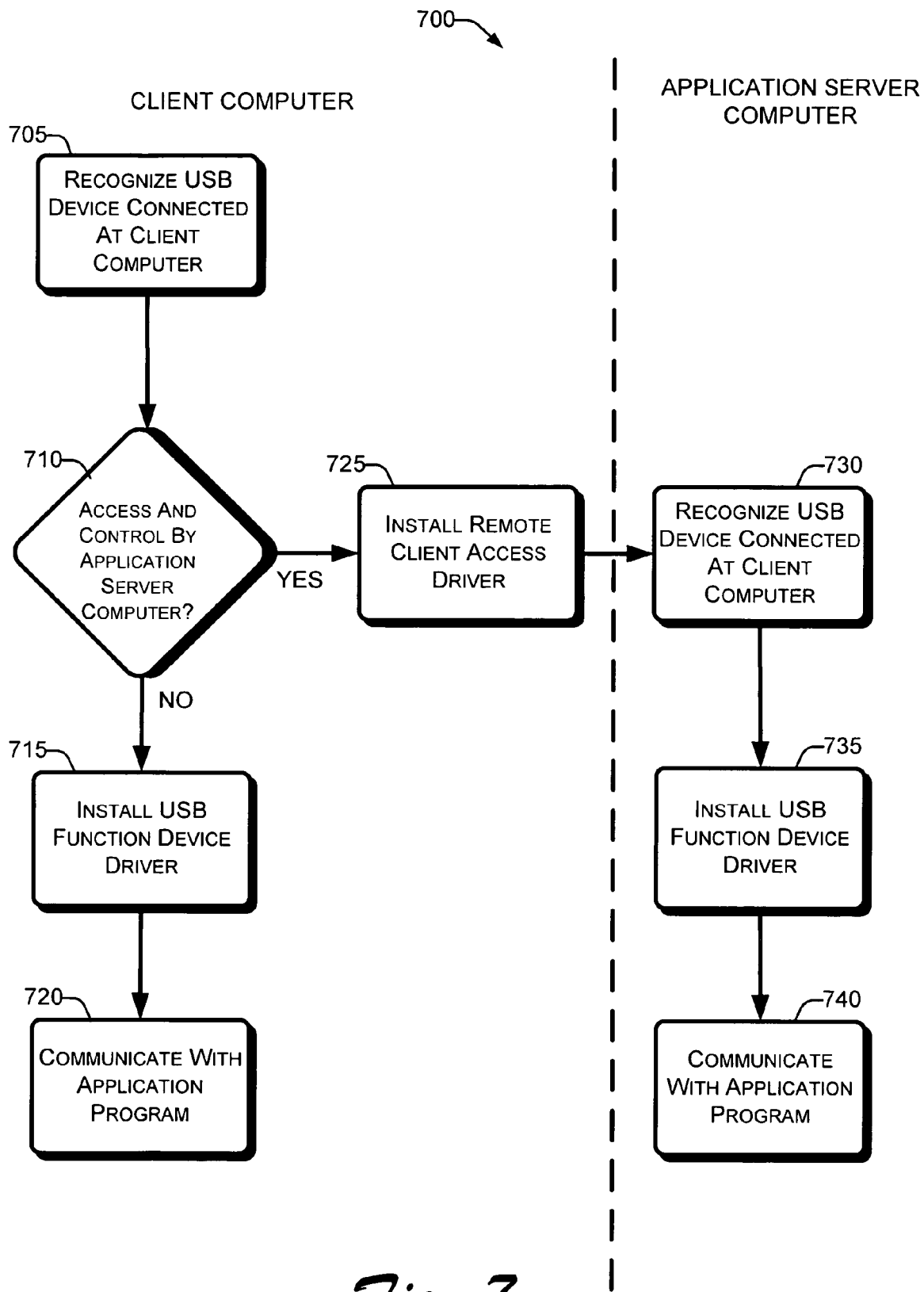
FIG. 7 is a flow diagram illustrating directing or redirecting control of a client computer USB device to a client computer or an application server computer.

FIG. 7 shows a process 700 to direct or redirect access and control of a USB device to a remote computer such as application server computer 405. The process 700 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. The process 700 is described with reference to application server computer 405 and client computer 410 described in FIGS. 4, 5, and 6, where application server computer 405 and client computer 410 provide for means to perform particular processes. Although described as a flowchart, it is contemplated that processes may take place concurrently.

At block 705, a USB device is connected to a client computer. The device may be physically connected to a USB port on the client computer. The USB port physically connects with a USB controller. A USB bus driver logically connects with the USB controller. The USB bus driver recognizes and identifies the particular USB device and further identifies a class that the USB device is grouped. Through the recognition process, which in this example is particularly performed by the USB bus driver, plug and play (PNP) of the USB device is provided. In other words, the USB device is recognized, and if applicable, appropriate software is installed without user intervention. A data object referred to as a physical device object (PDO) and interfaces specific to the USB device are particularly provided by the USB bus driver. The PDO and interfaces are communicated to components, modules, and drivers connected to the USB bus driver.

In certain cases, it is desirable for the client computer to provide functionality to, or access and control of the connected USB device (i.e., following the "NO" branch of block 710). At block 715, when an application program at the client computer provides functionality for the USB device, a specific USB function device driver is installed or loaded. The USB function device driver is specific to a device class of the USB device. The USB function device driver particularly provides a functional device object (FDO) and interfaces specific to the connected USB device. The FDO and interfaces are communicated to components, modules, and drivers connected to the USB function driver. A communication path is provided from the application program to the USB device.

At block 720, communications are performed between the USB device and the application program. The application program may send I/O control (IOCTL) code that describes requests for data. The application program may also receive IOCTL code. IOCTL code may be converted to I/O request packets (IRP) after they are sent from the application program. Furthermore, IOCTL code received by the application program may originate as IRPs from the USB device.

In certain other cases, it is desirable for the application server computer to provide functionality to, or access and control of the connected USB device (i.e., following the "YES" branch of block 710). Exemplary cases include situations when the client computer has limited application programs or no application programs to provide adequate functionality to the USB device. In other cases, although an application program may reside at client computer to provide functionality for the USB device, a user at the client computer may desire to have application server computer provide the functionality for the USB device.

At block 725, a remote client access driver is installed or loaded at the client computer. Communications from the application server computer, and specifically the application program at the server computer, are directed through the remote client access driver, essentially providing a communication path from the application server computer (i.e., application program of the application server computer) to the USB device. A client transport driver may be provided at the client computer that allows communication with the application server computer. The application server computer may include a server transport driver that receives and sends communication to the A client transport driver of the client computer.

At block 730, the USB device is recognized at the application server computer. In particular, a proxy USB bus driver implemented at the application server computer recognizes the USB device and particular class of the USB device.

At block 735, the remote client access bus driver loads or installs a USB function device driver specific to the class of the USB device. The USB function device driver is specific to a device class or group in which the USB device belongs.

At block 740, communications are performed between the USB device and the application program resident at the application server computer. The application program may send IOCTLs that describe requests for data which are converted to IRPs that are received by the USB device. An FDO (device specific data object) may be created and provided by the USB function device driver. The FDO represents the USB device to the application program.

Exemplary Computer

FIG. 8 shows an exemplary computing device or computer 800 suitable as an environment for practicing aspects of the subject matter, for example as client computer 410 or application server computer 405. The components of computer 800 may include, but are not limited to, a processing unit 820, a system memory 830, and a system bus 821 that couples various system components including the system memory 830 to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computer 800 typically includes a variety of computer-readable media. Computer-readable media can be any available media that can be accessed by computer 800 and includes both volatile and nonvolatile media, removable and non-removable media. By way of example, and not limitation, computing device-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 830 includes computing device storage media in the form of volatile and/or nonvolatile memory such as read only memory (ROM) 831 and random access memory (RAM) 832. A basic input/output system 833 (BIOS), containing the basic routines that help to transfer information between elements within computer 800, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The exemplary computer 800 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface such as interface 850.

The drives and their associated computing device storage media discussed above and illustrated in FIG. 8 provide storage of computer-readable instructions, data structures, program modules, and other data for computer 800. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the exemplary computer 800 through input devices such as a keyboard 848 and pointing device 861, commonly referred to as a mouse, trackball, or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port, or in particular a USB port. A monitor 862 or other type of display device is also connected to the system bus 821 via an interface, such as a video interface 890. In addition to the monitor 862, computing devices may also include other peripheral output devices such as speakers 897 and printer 896, which may be connected through an output peripheral interface 895.

The exemplary computer 800 may operate in a networked environment using logical connections to one or more remote computing devices, such as a remote computing device 880. The remote computing device 880 may be a personal computing device, a server, a router, a network PC, a peer device or other common network node, and typically includes many or all of the elements described above relative to computer 800, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computing device networks, intranets, and the Internet.

When used in a LAN networking environment, the exemplary computer 800 is connected to the LAN 871 through a network interface or adapter 870. When used in a WAN networking environment, the exemplary computer 800 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the exemplary computer 800, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computing devices may be used.

CONCLUSION

The above-described selectively directing or redirecting access and control of USB devices connected to a client computer to a server computer. Although the invention has been described in language specific to structural features and/or methodological acts, it is to be understood that the invention defined in the appended claims is not necessarily limited to the specific features or acts described. Rather, the specific features and acts are disclosed; as exemplary forms of implementing the claimed invention.

The invention claimed is:

1. An application server comprising:
 a processor that executes an application program on behalf of a remote client, the application program remotely controlling a client USB device at the remote client;
 a server driver stack implemented by the processor on the application server, the server driver stack comprising:
  a USB function driver implemented on the application server having an interface for use by the application program to interact with the client USB device;
  a proxy USB bus driver implemented on the application server configured to communicate with the remote client;
  the USB function driver, on the application server, configured to interface with the proxy USB bus driver on the application server to control the client USB device at the remote client; and
 the application program executing on the application server using the server driver stack to remotely control the client USB device at the remote client by passing control communications to the client USB device via the server driver stack for remotely accessing and controlling the client USB device.

2. An application server as recited in claim 1, wherein the proxy USB bus driver is configured to communicate with an actual USB bus driver at the remote client in order to interact with the client USB device.

3. An application server as recited in claim 1, the server driver stack further comprising a server transport driver configured to provide communications between the proxy USB bus driver and the remote client.

4. A client services system comprising:
 an application server as recited in claim 1;
 the remote client, wherein the remote client has a client USB bus driver configured to interact with the client USB device;
 wherein the proxy USB bus driver communicates with the client USB bus driver in order to interact with the client USB device.

5. A client services system comprising:
 an application server as recited in claim 1, the server driver stack further comprising a server transport driver configured to provide communications between the proxy USB bus driver and the remote client;
 the remote client, wherein the remote client has a client driver stack, the client driver stack comprising:
  a client USB bus driver on the remote client configured to interact with the client USB device; and
  a client transport driver on the remote client configured to provide communications between the client USB bus driver and the application server.

6. A client services system comprising:
 an application server as recited in claim 1, the server driver stack further comprising a server transport driver on the application server configured to provide communications between the proxy USB bus driver on the application server and the remote client;
 the remote client, wherein the remote client has a client USB bus driver configured to interact with the client USB device.

7. A client/server remote services system comprising:
 an application server as recited in claim 1;
 the remote client, wherein the remote client has a client driver stack comprising:
  a client USB bus driver configured to interact with the client USB device; and
  a USB host controller driver through which the client USB bus driver interacts with the client USB device.

8. A client that provides a user interface for a first application program executed by an application server, comprising:
 a first USB device;
 a client USB driver stack comprising:
  a USB host controller driver that communicates with the first USB device;
  a USB bus driver that interacts with the USB device through the USB host controller, the USB bus driver having an interface to communicate with a USB function driver; and
  a client transport driver that uses an interface of the USB bus driver to pass control communications between the first application program executed by the application server and the first USB device through the client driver stack for enabling the first application program on the application server to remotely interact with the first USB device at the client.

9. A client as recited in claim 8, wherein the client transport driver communicates with a server USB function driver implemented by the application server that provides an interface for the first application program to interact with the first USB device.

10. A client as recited in claim 8, further comprising:
 a second USB device;
 wherein the USB host controller driver communicates with the second USB device;
 a second application program executed by the client;
 a client USB function driver on the client that uses the interface of the USB bus driver to provide communications between the second application program and the second USB device through the client driver stack.

11. A client as recited in claim 8, wherein the client transport driver communicates with a proxy USB bus driver implemented by the application server, wherein the proxy USB bus driver is configured to create a physical data object (PDO) that is a data object specific to the first USB device for distinguishing the first USB device from other USB devices.

12. A client as recited in claim 8, further comprising:
a second USB device;
wherein the USB host controller driver communicates with the second USB device;
a second application program executed by the client;
a client USB function driver on the client that uses the interface of the USB bus driver to provide communications between the second application program and the second USB device through the client driver stack;
wherein the client transport driver communicates with a server USB function driver implemented by the application server.

13. A method of interacting with first and second USB devices that are located at a client computer, comprising:
providing a user interface at the client computer on behalf of a hosted application program executed by an application server;
executing a local application program by the client computer;
providing a USB driver stack at the client computer to identify the USB devices;
passing communications between the hosted application program executing on the application server and the first USB device through the USB driver stack for the hosted application program to remotely interact with the first USB device; and
communicating between the local application program and the second USB device through the USB driver stack for the local application program to interact with the second USB device.

14. A computer storage medium having computer-executable instructions stored thereon for performing the method recited in claim 13, wherein the medium does not include signals.

15. A method as recited in claim 13, wherein the USB driver stack includes at least a USB function driver and a USB bus driver.

16. A computer storage medium having computer-executable instructions stored thereon for performing the method recited in claim 15, wherein the medium does not include signals.

17. A method as recited in claim 13, wherein the USB driver stack further includes least a USB function driver, a USB bus driver and a USB host controller driver.

18. A computer storage medium having computer-executable instructions stored thereon for performing the method recited in claim 17, wherein the medium does not include signals.

19. A method as recited in claim 13, further comprising communicating between the USB driver stack and a USB function driver implemented by the application server, wherein communications are generated by the hosted application program on the application server for controlling the first USB device.

20. A computer storage medium having computer-executable instructions stored thereon for performing the method recited in claim 19, wherein the medium does not include signals.

* * * * *

UNITED STATES PATENT AND TRADEMARK OFFICE
CERTIFICATE OF CORRECTION

| | | |
|---|---|---|
| PATENT NO. | : 7,912,987 B2 | Page 1 of 1 |
| APPLICATION NO. | : 11/036893 | |
| DATED | : March 22, 2011 | |
| INVENTOR(S) | : Zhong et al. | |

It is certified that error appears in the above-identified patent and that said Letters Patent is hereby corrected as shown below:

On the Title Page, change item (75)

Column 1, line 73, change "Remond," to -- Redmond, --.

Signed and Sealed this
Tenth Day of May, 2011

David J. Kappos
*Director of the United States Patent and Trademark Office*